United States Patent [19]

Ostenak et al.

[11] Patent Number: 4,684,217
[45] Date of Patent: Aug. 4, 1987

[54] HYDROFLUORIC ACID-RESISTANT COMPOSITE WINDOW AND METHOD FOR ITS FABRICATION

[75] Inventors: Carl A. Ostenak, Santa Fe; Harold A. Mackay, Los Alamos, both of N. Mex.

[73] Assignee: The United States of America as represented by the United States Department of Energy, Washington, D.C.

[21] Appl. No.: 756,101

[22] Filed: Jul. 18, 1985

[51] Int. Cl.$^4$ .............................................. G02B 27/02
[52] U.S. Cl. ................................... 350/319; 350/311; 156/104; 206/524.5
[58] Field of Search ................ 350/319, 3.61, 311, 350/105; 430/1, 2, 321, 323; 73/323; 206/524.3, 524.5, 524.9; 156/104

[56] References Cited

U.S. PATENT DOCUMENTS

| | | | |
|---|---|---|---|
| 2,209,570 | 7/1940 | Kraft | 206/524.5 |
| 2,317,076 | 4/1943 | Mick et al. | 206/524.3 |
| 3,633,984 | 1/1972 | Smollen et al. | 350/311 |
| 3,764,794 | 10/1973 | King et al. | 350/319 |
| 3,898,358 | 8/1985 | Ryan et al. | 350/3.61 |
| 3,912,542 | 10/1975 | Hirano et al. | 156/104 |
| 4,105,118 | 8/1978 | Williams, Jr. et al. | 206/524.5 |
| 4,166,536 | 9/1979 | Roberts et al. | 206/524.5 |
| 4,268,117 | 5/1981 | Sevelin | 350/105 |
| 4,362,587 | 12/1982 | Baudin et al. | 156/104 |
| 4,433,893 | 2/1984 | Masazi et al. | 350/3.61 |
| 4,519,154 | 5/1985 | Molari, Jr. | 350/105 |

*Primary Examiner*—John K. Corbin
*Assistant Examiner*—Loha Ben
*Attorney, Agent, or Firm*—Lee W. Huffman; Ray G. Wilson; Judson R. Hightower

[57] ABSTRACT

A hydrofluoric acid-resistant composite window and method for its fabrication are disclosed. The composite window comprises a window having first and second sides. The first side is oriented towards an environment containing hydrofluoric acid. An adhesive is applied to the first side. A layer of transparent hydrofluoric acid-resistant material, such as Mylar, is applied to the adhesive and completely covers the first side. The adhesive is then cured.

14 Claims, 2 Drawing Figures

HYDROFLUORIC ACID-RESISTANT COMPOSITE WINDOW AND METHOD FOR ITS FABRICATION

This invention is the result of a contract with the Department of Energy (Contract No. W—7405—Eng—36).

BACKGROUND OF THE INVENTION

The invention described herein relates generally to composite windows and more particularly to hydrofluoric acid-resistant composite windows and methods for their fabrication.

There are many industrial processes in which hydrofluoric acid is used. Examples are aluminum production, chlorofluorocarbon production, uranium production and petroleum alkylation for production of gasoline octane improvers. Windows are used to visually monitor these and other processes. A major problem in these processes is that the hydrofluoric acid etches the exposed surfaces of the windows resulting in reduced visibility. It can be expensive to replace the windows frequently and, when gloveboxes are used, the impaired visibility reduces operator efficiency.

In facilities that produce enriched uranium and plutonium metals using fluorination followed by reduction, the reduced visibility poses a dual problem. Not only is operatior efficiency reduced because of impaired visibility, but personnel radiation exposure is increased because of the necessary increase in time spent working in the gloveboxes. Consequently, it is highly desirable to design a protected window with a long service life for use in processes involving hydrofluoric acid.

U.S. Pat. No. 4,433,893 to Yokota discloses a process for producing glass holograms having an uneven surface. The diffraction efficiency of the hologram is increased by exposing the hologram to dilute hydrofluoric acid. When producing a transmission-type glass hologram, the back surface of the glass hologram can be protected from the hydrofluoric acid by covering the back of the hologram with an adhesive tape having a Mylar base. The Yokota process is distinguishable from the present invention in several ways. The Yokota process increases the diffraction efficiency of a hologram by applying hydrofluoric acid to the hologram and etching its surface. The present invention protects windows from hydrofluoric acid by covering the exposed side of the windows with a layer of hydrofluoric acid-resistant transparent material. Yokota discloses the protection of the back of the glass hologram with an adhesive tape comprising Mylar. There is no mention of the need for transparency in Yokata. There is no need to visually inspect a process in Yokota. Yokota is not concerned with the protection of a glass window with transparent material to permit a process to be visually monitored. The process disclosed by Yokota involves hydrofluoric acid treatments lasting no more than two and one-half minutes. Yokota is not concerned with long-term protection from hydrofluoric acid. Moreover, Yokota is not concerned with abrasion resistance or protection from concentrated hydrofluoric acid. Yokota merely teaches that an adhesive tape made with Mylar can protect one side of a hologram from dilute hydrofluoric acid for short periods of time.

SUMMARY OF THE INVENTION

One object of the present invention is to provide a method and device for protecting windows from hydrofluoric acid.

Another object of the invention is to greatly increase the service life of windows for monitoring processes using hydrofluoric acid.

Still another object of the invention is to reduce personnel radiation exposure for uranium and plutonium workers using glovebox windows.

To achieve the foregoing and other objects, and in accordance with the purposes of the present invention, as embodied and broadly described herein, there is provided a device and method for protecting windows from hydrofluoric acid. The device comprises a window having first and second sides. The first side is oriented towards an environment containing hydrofluoric acid and the second side is located opposite the first side. An adhesive is disposed on the first side and a layer of hydrofluoric acid-resistant transparent material is disposed on the adhesive and held thereby over the first side. The transparent layer completely covers the first side and protects it from the environment containing hydrofluoric acid. The layer of transparent material can be a nonplastic such as calcium fluoride. The layer of transparent material is preferably polyethylene terephthalate. The layer can also be made of plastics such as polyvinylidene fluoride, polycarbonate, fluorinated ethylene-propylene or polyurethane. The adhesive can be a pressure-sensitive adhesive, urethane or epoxy. In practicing the method of the invention, an adhesive is applied to the first side of a window having first and second sides. A layer of transparent hydrofluoric acid-resistant material is then applied over the adhesive. The layer completely covers the first side of the window. The adhesive is allowed to stand. The adhesive can be degased to remove bubbles before the layer of material is applied. The adhesive can be allowed to cure at room temperature for about twelve to sixteen hours and then it may be heated to about 60° C. for about two hours to reduce the ambient cure time. The adhesive can be allowed to cure at room temperature for about two to three days.

One advantage of the present invention is that the high labor costs for frequently replacing windows used to monitor processes using hydrofluoric acid are avoided.

Another advantage of the invention is that worker productivity is increased by eliminating the reduced visibility caused by acid-etched glovebox windows.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings.

DETAILED DESCRIPTION OF THE INVENTION

Figure 1:
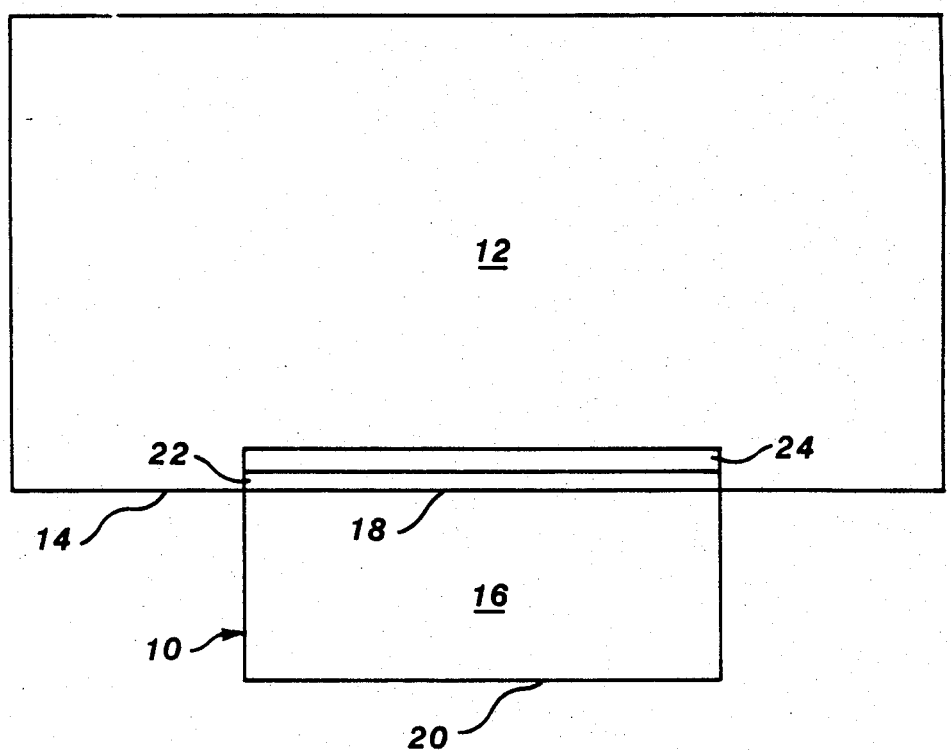
FIG. 1 shows a plan view in cross-section of an embodiment of the invention used in a facility using hydrofluoric acid

Reference is now made to FIG. 1, which shows a plan view in cross-section of an embodiment of the invention used in a facility using hydrofluoric acid. The present invention is a hydrofluoric acid-resistant composite window 10 for permitting inspection of an environment 12 containing hydrofluoric acid. The environment 12 can be found in a facility, represented by enclosure 14, in which uranium or plutonium is produced. The composite window 10 comprises a window 16 having a first side 18 and a second side 20. First side 18 is oriented towards the environment 12 containing hydrofluoric acid. The second side 20 is located opposite first side 18. It is first side 18 that needs protection from the hydrofluoric acid-containing environment 12.

An adhesive 22 is disposed on first side 18. Adhesive 22 can be a urethane, epoxy or pressure-sensitive adhesive. A layer 24 of hydrofluoric acid-resistant transparent material is disposed on adhesive 22 and held thereby over first side 18. Layer 24 completely covers and protects first side 18 from the environment 12 containing hydrofluoric acid. Layer 24 is preferably made of polyethylene terephthalate, sold under the trademark Mylar by the Du Pont company. Layer 24 can also be made of polycarbonate, sold under the trademark Lexan, polyurethane, polyvinylidene fluoride or fluorinated ethylene-propylene. Layer 24 is preferably about 0.0127 cm thick but it could be much thicker or as thin as about 0.001 cm.

A number of composite windows 10 were made using 0.0127 cm layers 24 of Mylar film and an epoxy-based adhesive 22 formed with three parts Shell Epon 815 and two parts of Versamid 140. These composite windows 10 have shown no sign of etching or scratching due to abrasion after two hundred production days in a facility making plutonium metal. Unprotected windows in that facility previously required replacement every ten to fifteen production days because of severe etching and reduced visibility.

These composite windows 10 were tested for resistance to highly concentrated acid. An aqueous solution of thirty molar hydrofluoric acid was left on the windows 10 for two days. There was no sign of etching.

Figure 2:
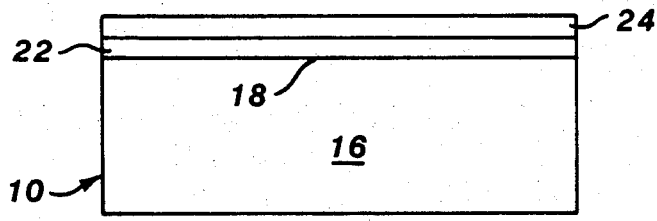
FIG. 2 shows an end view of an embodiment of the invention.

Reference is now made to FIG. 2 which shows an end view of an embodiment of the invention. Composite window 10 is formed by applying adhesive 22 to first side 18 of window 16. A layer 24 of transparent hydrofluoric acid-resistant material is then applied to adhesive 22. Layer 24 completely covers first side 18. Adhesive 22 is then cured with heat to complete the formation of composite window 10.

Before layer 24 is applied to adhesive 22, adhesive 22 can be degased to remove any bubbles it may contain. Removing bubbles results in a better bond between layer 24 and window 16. Adhesive 22 can be allowed to cure at room temperature for about twelve to sixteen hours and then is heated to about 60° C. for about two hours to complete the curing process. Adhesive 22 can be allowed to cure at room temperature for about two to three days.

The foregoing description of the preferred embodiments of the invention has been presented for purposes of illustration and description. It is not intended to be exhaustive or to limit the invention to the precise forms disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A hydrofluoric acid-resistant composite window for visual acess to an environment containing hydrofluoric acid, said composite window comprising:
   a. a window, said window having first and second sides, said first side being effective for orientation towards the environment containing hydrofluoric acid, said second side being located opposite said first side:
   b. an adhesive disposed on said first side and cured to remove contained bubbles; and
   c. a layer of hydrofluoric acid-resistant transparent material, said layer being disposed on said adhesive and held thereby over said first side, said layer completely covering said first side for protecting said first side from the environment containing hydrofluoric acid.

2. The composite window of claim 1 wherein said layer of hydrofluoric acid-resistant transparent material comprises a plastic.

3. The composite window of claim 2 wherein said layer of hydrofluoric acid-resistant transparent plastic comprises polyethylene terephthalate.

4. The composite window of claim 2 wherein said layer of hydrofluoric acid-resistant transparent plastic comprises polycarbonate.

5. The composite window of claim 2 wherein said layer of hydrofluoric acid-resistant transparent plastic comprises fluorinated ethylene-propylene.

6. The composite window of claim 2 wherein said layer of hydrofluoric acid-resistant transparent plastic comprises polyurethane.

7. The composite window of claim 2 wherein said layer of hydrofluoric acid-resistant transparent plastic comprises polyvinylidene fluoride.

8. The composite window of claim 1 wherein said adhesive comprises urethane.

9. The composite window of claim 1 wherein said adhesive comprises epoxy.

10. The composite window of claim 1 wherein said adhesive comprises a pressure-sensitive adhesive 11. A method of forming a hydrofluoric acid-resistant composite window comprising the steps of:
    a. applying an adhesive to the first side of a window having first and second sides;
    b. curing said adhesive to remove contained bubbles; and
    c. applying a layer of transparent hydrofluoric acid-resistant material to the adhesive and completely covering the first side of the window with the layer.

12. The method of claim 11 further comprising the step of degasing the adhesive to remove bubbles before the layer is applied.

13. The method of claim 11 wherein the adhesive is allowed to cure at room temperature for about two to three days.

14. A method of forming a hydrofluoric acid-resistant composite window comprising the steps of:
 a. applying an adhesive to the first side of a window having first and second sides;
 b. curing the adhesive at room temperature for about 12 to 16 hours and then heating to about 60° C. for about 2 hours; and
 c. applying a layer of transparent hydrofluoric acid-resistant material to the adhesive and completely covering the first side of the window with the layer.

* * * * *